(12) United States Patent
Simons et al.

(10) Patent No.: US 9,842,094 B2
(45) Date of Patent: Dec. 12, 2017

(54) UNDO, REDO, AND STATE SWITCHING USING CONTENT-ADDRESSABLE DATA STRUCTURES

(71) Applicant: Adobe Systems Incorporated, San Jose, CA (US)

(72) Inventors: David P. Simons, Seattle, WA (US); James Acquavella, Seattle, WA (US); Gregory Scott Evans, San Francisco, CA (US); Joel Brandt, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 43 days.

(21) Appl. No.: 15/042,591

(22) Filed: Feb. 12, 2016

(65) Prior Publication Data
US 2017/0235710 A1   Aug. 17, 2017

(51) Int. Cl.
| | | |
|---|---|---|
| *G06F 17/00* | (2006.01) | |
| *G06F 17/22* | (2006.01) | |
| *G06F 17/30* | (2006.01) | |
| *G06F 3/0482* | (2013.01) | |
| *G06F 17/24* | (2006.01) | |
| *G06T 13/80* | (2011.01) | |
| *G06F 3/00* | (2006.01) | |
| *G06F 3/16* | (2006.01) | |

(52) U.S. Cl.
CPC .......... *G06F 17/2288* (2013.01); *G06F 3/005* (2013.01); *G06F 3/0482* (2013.01); *G06F 3/16* (2013.01); *G06F 17/2205* (2013.01); *G06F 17/24* (2013.01); *G06F 17/30097* (2013.01); *G06F 17/30221* (2013.01); *G06T 13/80* (2013.01); *G06F 17/30309* (2013.01)

(58) Field of Classification Search
CPC .......... G06F 17/30309; G06F 17/3032; G06F 17/2288
See application file for complete search history.

(56) References Cited

U.S. PATENT DOCUMENTS

| | | | |
|---|---|---|---|
| 2008/0012866 A1* | 1/2008 | Forbes | .................... G06T 13/40 345/473 |
| 2008/0201339 A1* | 8/2008 | McGrew | ................ G06Q 50/18 |
| 2014/0222758 A1* | 8/2014 | March | ................ G06F 17/3023 707/638 |
| 2015/0244836 A1* | 8/2015 | Poletto | ................ H04L 29/0809 709/203 |

\* cited by examiner

*Primary Examiner* — Andrew McIntosh
(74) *Attorney, Agent, or Firm* — Kilpatrick Townsend & Stockton LLP

(57) ABSTRACT

Systems and methods for switching to different states of electronic content being developed in a content creation application. This involves storing different states of the electronic content using a content-addressable data store, where individual states are represented by identifiers that identify items of respective states stored in the content-addressable data store. Identical items that are included in multiple states are stored once in the content-addressable data store and referenced by common identifiers. Input is received to change the electronic content to a selected state of the different states and the electronic content is displayed in the selected state based on identifiers for the selected state. In this way, undo, redo, and other commands to switch to different states of electronic content being developed are provided.

20 Claims, 8 Drawing Sheets

Empty folder

Import "Headless Horseman.psd"

New Scene for "Headless Horseman"

UNDO, REDO, AND STATE SWITCHING USING CONTENT-ADDRESSABLE DATA STRUCTURES

FIELD OF THE INVENTION

This disclosure relates generally to computer-implemented methods and systems and more particularly relates to improving the efficiency and effectiveness of computing systems used to create and edit documents, web pages, animations, images, video, rich Internet applications, and other electronic content, as well as to the creation of such computing systems for creating and editing electronic content.

BACKGROUND OF INVENTION

Software applications used to create and/or edit electronic content (referred to herein as "content creation applications") use various techniques to store the electronic content that is being developed. Only the simplest content creation applications are able to store complete copies of content after every change. For example, a simple photo editing application might save a bitmap of pixel color values of an edited image after each change. This technique is only practical for electronic content that can be stored as a relatively small structure and in a context in which only a few changes are made. For more complicated electronic content and electronic content that involves many changes, implementing such a technique would require too much data storage to be practical or feasible.

Accordingly, many content creation applications use temporary memory to temporarily store incremental delta encoding in which changes are recorded and require the user to manually save the electronic content to more permanent storage. Typically, a user adds text, graphics, and other objects to a canvas area on the content development application and periodically saves the electronic content as a file, overwriting the previous version of the file. For example, a user may position several rectangles on a canvas, add labels to each of the rectangles, and then add arrows between the rectangles to create a flow diagram. The user then saves a file containing the electronic content to a local or network hard drive. While the user is editing the content, in between saves, changes that are made to the electronic content are stored in temporary memory and used to facilitate undo, redo, and other editing operations.

There are numerous disadvantages to the traditional technique of storing temporary changes to memory and requiring the user to periodically save the current version as a more-permanent file. With these techniques, users must manually save the files, which is inconvenient to many users. Moreover, if there is a system crash or similar problem, recent changes made since the most recent save are lost. In addition, the undo/redo features of these systems are limited to changes made during the current editing session, because edits from prior editing sessions were stored in temporary memory and lost when those editing sessions ended.

In addition to these disadvantages to the end users of the content creation applications, implementing undo/redo functions in these systems is burdensome on the developers who create the content creations application. This is because the developers must manually program the undo of any function that the developers program. For example, if a developer programs an "add rectangle" function, he or she must also program the undo of the add rectangle function. Similarly, implementing a delete function requires programming the delete but also accounting for what will happen if the delete is undone, e.g., requiring the programmer to store a copy of the deleted object in memory, its location, its size, its label, etc. To implement any new function, the programmer must thus also implement the undo of the function. This slows the development process down significantly and tends to introduce bugs that are difficult to find and correct.

SUMMARY

As described above, existing techniques for storing changes made to electronic content by content creation applications require end users to manually save the electronic content, result in lost changes during system crashes, limit undo/redo capabilities, and are burdensome on the content creation application developers who have to account for the undoing of editing features that they implement. These and other problems are addressed by automatically storing different states of the electronic content using a content-addressable data store. The individual states of the electronic content are compactly represented by identifiers that identify items of respective states stored in the content-addressable data store. Identical items that are included in multiple states are stored only once in the content-addressable data store and referenced by common identifiers. In this way, the state of the electronic content after the user makes each change to the electronic content (e.g., add rectangle, change rectangle size, add label, etc.) is individually stored in an extremely compact way. The storage is compact because items that are the same in different states are only stored once. Each of the different states references the same stored item by the item's identifier. Storing the different states in this way also allows any state of the electronic content to be accessed going back to the initial creation of the electronic content. Undo/redo features are thus not limited to edits made during a current editing session. In addition to providing benefits to the end users of the content creation applications, the storage technique allows undo/redo functions to be provided without requiring the developers of the content creation application to specifically develop undo/redo features for individual functions. In sum, the end user's experience is enhanced and the developer's development tasks are simplified by techniques disclosed herein.

One embodiment of the invention provides a method of switching to different states of electronic content being developed in a content creation application. This embodiment of the invention involves storing different states of the electronic content using a content-addressable data store, where individual states are represented by identifiers that identify items of respective states stored in the content-addressable data store. Identical items that are included in multiple states are stored only once in the content-addressable data store and referenced by common identifiers. The embodiment of the invention further involves receiving input to change the electronic content to a selected state of the different states and displaying the electronic content in the selected state based on identifiers for the selected state. In this way, this embodiment of the invention allows undo, redo, and other commands to switch to different states of electronic content being developed.

These illustrative features are mentioned not to limit or define the disclosure, but to provide examples to aid understanding thereof. Additional embodiments are discussed in the Detailed Description, and further description is provided there.

DETAILED DESCRIPTION

Figure 1:
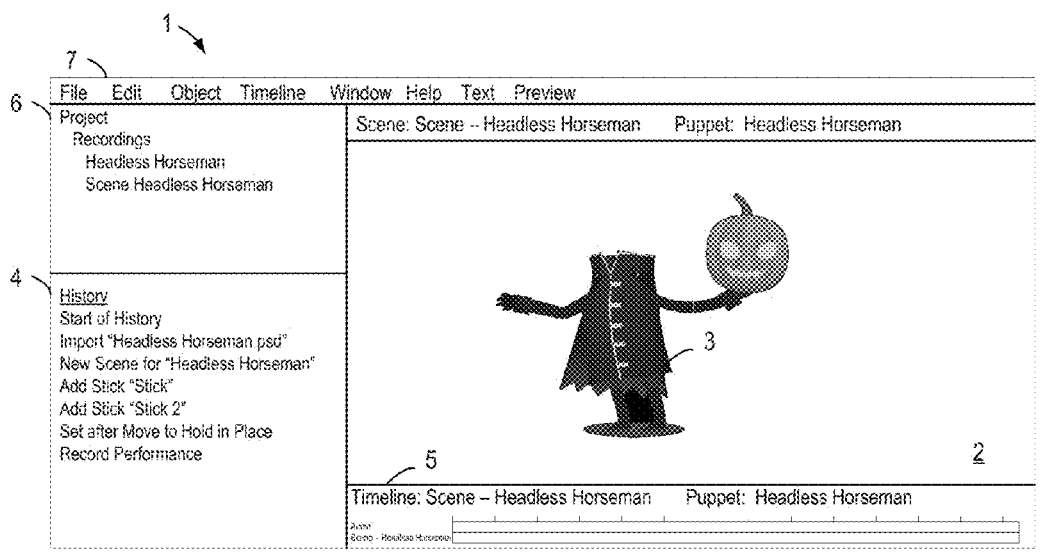
FIG. 1 is an exemplary user interface of a content creation application that allows a user to navigate to different states of the electronic content being edited.

Embodiments of the invention disclosed herein automatically store different states of electronic content using a content-addressable data store. The "content-addressable data store" is a data store in which content is retrieved based on the content itself, instead of or in addition to retrieval based on storage location. In one example, content that is stored in the data store is hashed and the hash is used as an identifier that can be used to retrieve the stored data. The hash also serves to identify when content does not need to be stored separately. For example, if a user creates a rectangle, data is created for the rectangle and a hash value is created for retrieving the rectangle, for example, to reproduce the rectangle when the electronic content is closed and later opened for editing. If the user adds a second rectangle that is separate from the first rectangle in the electronic content, the new state of the electronic content will include the two rectangles. Data is created and stored for the second rectangle, and a hash created based on the second rectangle content that is used to retrieve the second rectangle. The first rectangle is not stored again. For example, the system will hash the first rectangle and recognize that the hash is already in the data store with the first rectangle content. The first state is represented by the hash that identifies the first rectangle and the second state is represented by the hash that identifies the first rectangle and the hash that identifies the second rectangle. The actual data store, however, only includes the first rectangle data one time even though it appears in both of the states. The use of the content-addressable data store avoids the need to separately store all of the data for the first state and all of the data for the second state. Instead, the first rectangle data was stored only once and the second rectangle data was stored only once.

In this way, the system represents each of multiple states of the electronic content using one or more content identifiers and compactly stores the data for the multiple states. The term "state" refers to an instance of electronic content at a particular point during development, typically after a user action or other commit. The state of the electronic content will generally change after the user adds an item, deletes an item, changes an item, associates one item with another item, runs an edit function, or otherwise changes the electronic content. The "items" of the electronic content refer to displayed and hidden objects, layers, frames, timelines, scenes, recordings, pages, functions, and any other editable or configurable feature or attributes of the electronic content. Items of the electronic content are stored individually or in combination in the data store. In one embodiment, items are stored as blobs similar to blobs in a Git repository.

The individual states will generally include hierarchies of items. For example, a developer can add a rectangle and add a label for the rectangle. The hierarchy in this example will include a project folder node, with a rectangle folder node under the project node, and a rectangle node and a label node under the rectangle folder node. In one embodiment, the content addresses for items of a given hierarchy include content addresses for nodes of the hierarchy, e.g., an identifier for the entire project, an identifier for the rectangle folder (including the rectangle and its label), and individual identifiers for each of the rectangle and the label. In one embodiment, the hierarchy is structured as a hierarchy of trees and blobs similar to the hierarchy of the trees and blobs of a Git repository in which trees are storage folders and blobs are items of stored content.

Each state of the electronic content is represented by a corresponding address that identifies all of the items of the electronic content in that state. The content creation application is thus able to use the identifiers to independently build any state without referring to any other state. For example, in an example in which the user has first added a rectangle and then added a circle in the electronic content, when the user hits the "undo" button, the content creation application can return to the prior state without the circle without having to explicitly determine what has changed between the states. Rather, the system can simply rebuild the electronic content using the addresses of the content for the prior state. In this way, the content creation application allows a user to navigate to any prior state directly and without necessarily storing or determining differences between states.

The techniques disclosed herein provide numerous benefits over prior existing techniques for storing changes made to electronic content by content creation applications that require end users to manually save the electronic content, result in lost changes during system crashes, limit undo/redo capabilities, and are burdensome on the content creation application developers who have to account for the undoing of editing features that the implement. The techniques disclosed herein allow electronic content creation without requiring manual saves from the user. Rather, in one embodiment, after the user makes each change to the electronic content, a state of the electronic content is automatically saved. Because each state is automatically saved after each user change, there is significantly less risk that the user will lose work due to a system crash occurring after changes are made but before a manual save occurs. The user is also able to navigate directly to any prior state of the electronic content being developed all the way back to the initial creation of the electronic content.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Referring now to the drawings, FIG. 1 is an exemplary user interface 1 of a content creation application that allows a user to navigate to different states of the electronic content being edited. The exemplary user interface 1 includes a canvas 2 on which graphical aspects, such as a puppet 3, of the electronic content being developed are displayed and edited. The user interface 1 includes a history 4 of prior user actions, a timeline 5 for controlling time aspects of the electronic content being developed, a project area 6 for organizing and editing items of the electronic content being developed, and menu 7 for accessing editing features of the content creation application.

The history 4 of prior user actions in the user interface 1, in this example, lists: Start of History, Import "Headless Horseman.psd," New Scene for "Headless Horseman," Add Stick "Stick," Add Stick "Stick 2," and Set Stiffness to 50%, and Record Performance. Each of these is a command or action performed by the user resulting in a changed state of the electronic content being developed. Each command involves one or more changes that are committed to the electronic content. The user interface 1 allows the user to select any of the prior actions in the history 4 to change the state of the electronic content. For example, selecting Add Stick "Stick" in the history changes the state of the electronic content to a state in which only the Start of History, Import "Headless Horseman.psd", New Scene for "Headless Horseman", and Add Stick "Stick" actions have been performed.

In the particular example of FIG. 1, the content creation application is a character animator application in which one or more puppets are created and moved based on input received by capturing video and audio of a user. Other embodiments involve other types of content creation applications. In the character animator application of FIG. 1, the user creates a puppet 3 by importing an annotated .psd file. The user records one or more animations in which the puppet 3 moves based on movements of the user. In this particular example, a camera captures movement of the user and moves the puppet 3 based on the movements of the user. If the user moves his head, the puppet 3 moves his head. If the user raises his right eyebrow, the puppet 3 raises his right eyebrow. Similarly, the content creation application can receive audio of words spoken by the user and move the lips of the puppet 3 according to the interpreted (voice-recognized) words of the audio. The audio is included in the clip so that it seems that the puppet 3 is saying the words in the audio when the recording is played back.

In one embodiment, character animation electronic content includes one or more puppets and other objects added to a canvas area, movement-controlling elements such as sticks, background images, audio, recorded movements, among other things. These objects are items of the electronic content that are stored in a repository of content-addressable storage. Storing these items along with other items of the electronic content in content-addressable storage facilitates storing multiple states of the electronic content in a compact, space-efficient way. In one embodiment, the electronic content items are stored in a repository having a Git repository format so that tools designed for accessing Git repositories will work with the electronic content repository.

In one embodiment, items of the electronic content stored in the repository are identified by hashes of the items. A given state of the electronic content is specified by identifiers (e.g., hashes) of the items in the electronic content that are in that state. Each different state is specified by a different respective set of identifiers (e.g., hashes).

Figure 2:
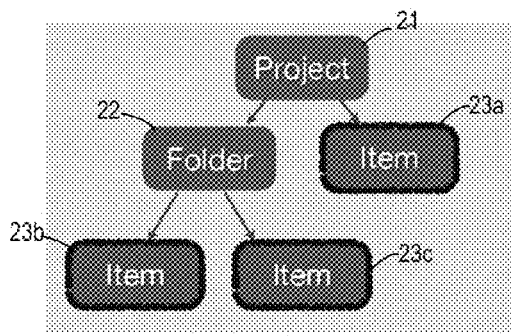
FIG. 2 illustrates a generic hierarchy of content items of electronic content.

FIG. 2 illustrates a generic hierarchy used to store electronic content. In this example, the top of the hierarchy is a project 21 that includes a folder 22 and an item 23a. The folder 22 includes item 23b and item 23c. The parts of the hierarchy are identified by a hash of the content of that folder or item. The hash of a folder is the hash of all the items in the folder, the items in the subfolders in the folder, etc. Using a hierarchical structure to organize items of electronic content is useful for many reasons. For example, it facilitates identifying that electronic content in large portions (e.g., a folder with many subfolders and items) has not changed simply by comparing hashes of parallel nodes in the respective hierarchies. In addition, it facilitates multiple users editing different versions of the electronic content because it allows one user's changes regarding a part of the electronic content to be separated from another user's changes to another part of the electronic content. Potential conflicts are easily identified by comparing hashes of parts of the electronic content to ensure that the two users did not simultaneously attempt to edit the same part of the electronic content.

After each action by the user, a new state of the electronic content is effectively saved. This is programmatically implemented in the content creation application by coding each action and giving each action a name. This name is used to display to the user in the history (see e.g., history 4 in FIG. 1) or other undo/redo menu. For example, the programmer programs an edit function used to insert a stick onto a character and gives the function the name "add stick" so that the user will be able to identify the action (and the subsequent state) using the name. For each action, the programmer implements one or more appropriate changes to items of the electronic content and then commits the changes under the specified name.

One embodiment uses a Git-formatted repository to store items of electronic content and uses the Git rollback function as a way to move forward and backward in time. This is a new use for a Git-formatted repository, which is typically used for file source code control. In a Git-formatted repository, files are blobs and folders are trees. Using a Git-formatted repository to store items of electronic content involves using folders that store files having, for example, the scenes, puppets, skins, audio, and other items of the electronic content. A data structure for any electronic content (word processing document, spreadsheet, graphic, animation, flowchart, and so on) can similarly be implemented in a Git-formatted repository by mapping the items of the electronic content to the Git blobs. The Git-formatted repository, in one embodiment, is consolidated for efficiency to make it more efficient, for example, using pack files or by replacing the entire repository with a single file. Regardless of how the Git repository is stored, however, these embodiments of the invention utilize the content-addressable nature of the repository and the hashed content as identifiers to achieve compact and persistent storage of individual states of potentially complicated electronic content. With a Git-formatted repository, each commit refers to a tree (referred to as the "top tree") and that tree refers to other trees and blobs giving state of the whole project at that moment. The next commit that comes along refers to another "top tree" which refers to trees and blobs (maybe some of the same trees and blobs) and refers to the previous commit. In this way, the commit references to trees, blobs, and prior commits allows any state to be recreated without using delta information specific to the differences between states.

Figure 3:
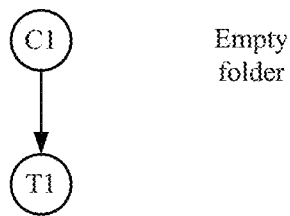
FIG. 3 illustrates an example of a project that includes different states of electronic content being initiated.

FIG. 3 illustrates an example of a project that will include different states of electronic content being initiated. In this example, a first commit causes data indicating an empty folder for the project to be stored in a repository. The data representing this "empty folder" state includes a top tree node T1 and a node C1 corresponding to the first commit. The node C1 includes a pointer to the tree node T1. Because the new project, at this point, is simply an empty folder, the top tree node T1 does not point to any other components (e.g., graphical objects) because no components have been added to the project.

Figure 4:
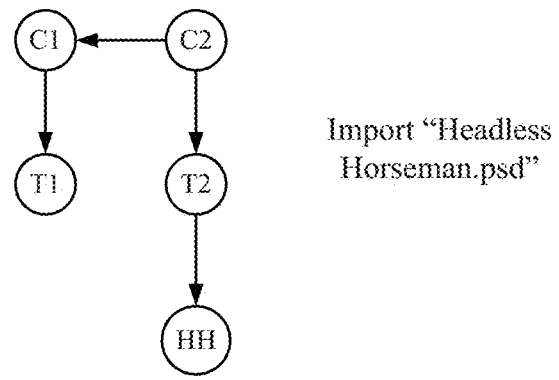
FIG. 4 illustrates an example of a first state of electronic content for the project depicted in FIG. 3 and associated identifier used to identify the content in a repository for the first state.

FIG. 4 illustrates an example of a first state of electronic content for the project depicted in FIG. 3. In this example, a second commit causes data, which indicates a state of the project with only a "Headless Horseman" character, to be stored in the repository for the project. The data representing this first state includes a tree node T2, an identifier for a node HH corresponding to the imported "Headless Horseman" character, and an identifier for a node C2 corresponding to the second commit. The node C2 corresponding to the second commit includes a pointer to the tree node T2. The tree node T2 includes a pointer to the node HH for the imported "Headless Horseman" character (e.g., a pointer to an identifier for the "Headless Horseman" content).

In this example, the first state of the electronic content occurs after the user imports the "Headless Horseman.psd" file. In response to this action, the content creation application creates data for a "Headless Horseman" character from the "Headless Horseman.psd" file and executes the second commit (represented by node C2), which commits the change. This data is stored in the repository in the folder corresponding to the project. The data created for the "Headless Horseman" is hashed, and the hash is used as the identifier for the node HH corresponding to the created Headless Horseman character.

In this example, the commit node C2 for the second commit includes a pointer to the tree node T2, which in turn includes a pointer to the data for the Headless Horseman character. Pointing this top tree node T2 indicates the change in state that occurred following the "empty folder" state. The node C2 representing the second commit also includes a pointer to the data for the commit node C1 representing the first commit, which is the parent of the commit node C2. The node C2 points to both the changed state reflected by the importation of the "Headless Horseman.psd" file and the previous state in which the folder for the project was empty. If the "empty folder" state is to be recreated at any point later in development, it can be recreated by simply traversing a set of commits that includes the commit node C2, which represents the state changes committed using the second commit and which points back to the commit node C1 representing the first commit. The node C1 in turn points to a tree node T1 corresponding to an empty folder (i.e., a tree node T1 that does not point to other objects in the project).

Figure 5:
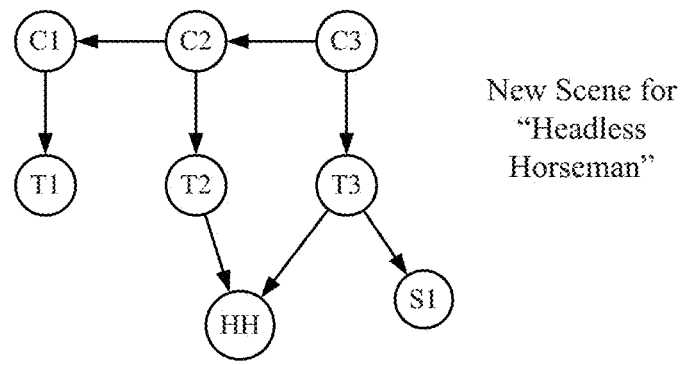
FIG. 5 illustrates an example of an additional state of electronic content for the project depicted in FIGS. 3-4 and associated identifiers used to identify the content in a repository for the additional state.

The second state of the electronic content occurs after the user creates a new scene for "Headless Horseman," as depicted in FIG. 5. In this example, in response to the user creating a new scene, the content creation application creates data for this scene, which is indicated by the node S1. The data for the scene indicated by the node S1 is hashed and the hash is used as the identifier for the created scene. Furthermore, a third commit causes data, which indicates a state of the project with the "Headless Horseman" character and the newly added scene, to be stored in the repository for the project.

This stored data includes data corresponding to the third commit, which is indicated by the commit node C3. The node C3, which represents the third commit, includes a pointer to a tree node T3. The tree node T3 includes a pointer to the node S1 (e.g., a pointer to the identifier of the data for the added scene) and a pointer to the node HH (e.g., a pointer to the identifier of the data for the Headless Horseman character). The node C3 also includes a pointer to the commit node C2 (i.e., the node representing the second commit), which allows for returning to the previous states to which the commit node C2 points (e.g., a state represented by the tree node T2 and any states accessible via the commit node C1).

Figure 6:
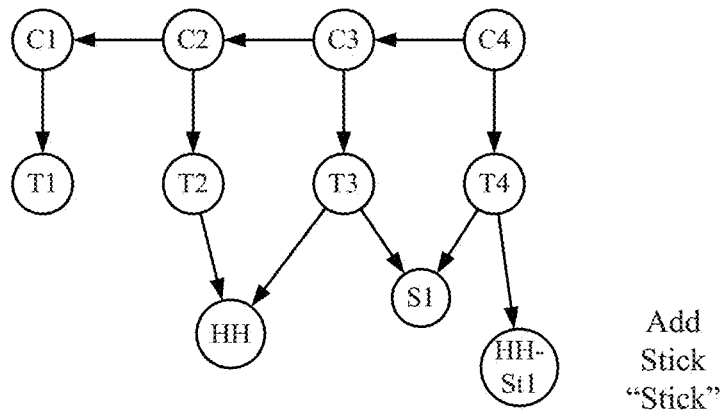
FIG. 6 illustrates an example of an additional state of electronic content for the project depicted in FIGS. 3-5 and associated identifiers used to identify the content in a repository for the additional state.

In this example, the user wants to make the puppet behave in a more rigid manner and decides to add a few sticks to the puppet. For instance, a third state of the electronic content occurs after the user creates a new stick for "Headless Horseman," as depicted in FIG. 6. In this example, in response to the user modifying the Headless Horsemen character to include a new stick, the content creation application creates data for this modified Headless Horsemen character having the stick, which is indicated by the node HH-St1. The data for this modified Headless Horsemen character having the stick, as indicated by the node HH-St1, is hashed. The hash is used as the identifier for the modified Headless Horsemen character having the stick. Furthermore, a fourth commit causes data, which indicates a state of the project with the modified "Headless Horseman" character having the newly added stick, to be stored in the repository for the project.

This stored data includes data corresponding to the fourth commit, which is indicated by node C4. The node C4 includes a pointer to a tree node T4. The tree node T4 includes a pointer to the node HH-St1 (e.g., a pointer to the identifier of the data for the modified Headless Horsemen character having the stick) and a pointer to the node S1 (e.g., a pointer to the identifier of the data for the scene). In this example, the tree nodes T3 and T4 point to the same node S1 because the addition of the stick to the Headless Horseman character did not change the scene. The node C4 also includes a pointer to the commit node C3, which allows for returning to the previous states to which the commit node C3 points (e.g., a state represented by the tree node T3 and any states accessible via the commit node C2).

Figure 7:
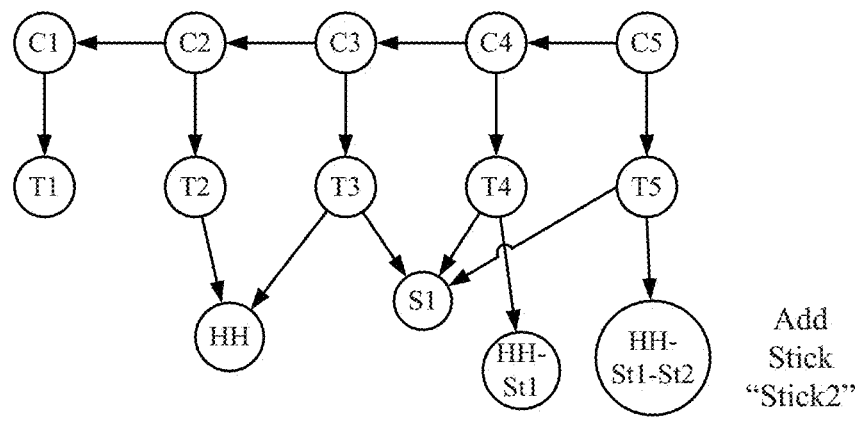
FIG. 7 illustrates an example of an additional state of electronic content for the project depicted in FIGS. 3-6 and associated identifiers used to identify the content in a repository for the additional state.

Similarly, a fourth state of the electronic content occurs after the user adds a second stick ("Stick 2") to the Headless Horseman character," as depicted in FIG. 7. In this example, in response to the user modifying the Headless Horsemen character to include a second stick, the content creation application creates data for this modified Headless Horsemen character having the second stick, which is indicated by the node HH,S1-St2. The data for this modified Headless Horsemen character having the second stick is hashed. The hash is used as the identifier of data for the modified Headless Horsemen character having the second stick. Furthermore, a fifth commit causes data, which indicates a state of the project with the modified Headless Horseman character having the second stick, to be stored in the repository for the project.

This stored data includes a node C5 corresponding to the fifth commit. The node C5 includes a pointer to a tree node T5. The tree node T5 includes a pointer to the node HH-St1-St2 (e.g., a pointer to the identifier of the data for the Headless Horsemen character having the two sticks) and a pointer to the node S1 (e.g., a pointer to the identifier of the data for the scene). The tree nodes T3, T4, and T5 point to the same node S1 because the addition of the second stick to the Headless Horseman character did not change the scene. The node C5 also includes a pointer to the commit node C4, which allows for returning to the previous states to which the commit node C4 points (e.g., a state represented by the tree node T4 and any states accessible via the commit node C3).

Figure 8:
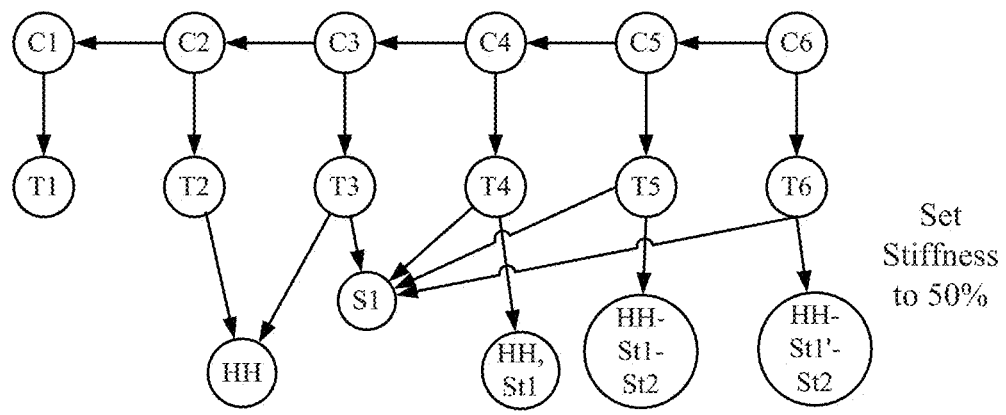
FIG. 8 illustrates an example of an additional state of electronic content for the project depicted in FIGS. 3-7 and associated identifiers used to identify the content in a repository for the additional state.

A fifth state of the electronic content occurs after the user uses an edit command to specify a "Set Stiffness to 50%," as depicted in FIG. 8. In this example, in response to the user uses an edit command to specify a "Set Stiffness to 50%," which affects the first stick, the content creation application creates data for this Headless Horsemen character having modified behavior affecting the first stick, which is indicated by the node HH-St1'-St2. The data for this Headless Horsemen character with the modified behavior, as indicated by the node HH-St1'-St2, is hashed and the hash is used as the identifier for the Headless Horsemen with the modified behavior. Furthermore, a sixth commit causes data, which indicates a state of the project with the modified behavior of the "Headless Horseman" character, to be stored in the repository for the project.

This stored data includes data corresponding to the sixth commit, which is indicated by a commit node C6. The commit node C6 includes a pointer to a tree node T6. The tree node T6 includes a pointer to the node S1 and a pointer to the node HH-St1'-St2 (e.g., a pointer to the identifier of data for data for the modified Headless Horseman character with the first and second sticks and the modified behavior). The commit node C6 also includes a pointer to the data for the commit node C5, which allows for returning to the previous states in a manner similar to that described above with respect to FIGS. 4-7.

Figure 9:
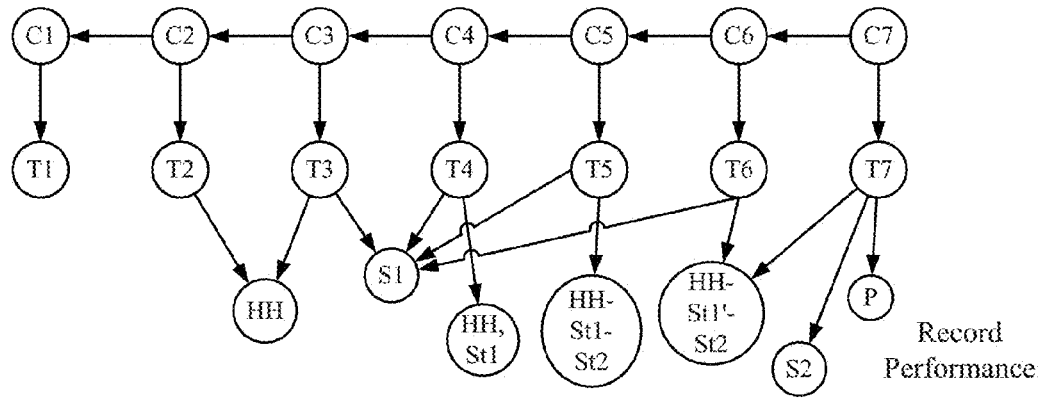
FIG. 9 illustrates an example of an additional state of electronic content for the project depicted in FIGS. 3-8 and associated identifiers used to identify the content in a repository for the additional state.

A sixth state of the electronic content occurs after the user modified the scene by recording a performance, as indicated in FIG. 9. In response to this action, the content creation application creates data for the recorded performance, indicated by the node P, and commits the action. The data for the recorded performance is stored in the repository in a folder for the project. The data for the recorded performance is hashed and the hash is used as the identifier P for the data. Data corresponding to the seventh commit (i.e., a commit node C7) is also stored in the repository. The commit node C7 includes a pointer to a tree node T7, which in turn includes a pointer to the node P (i.e., a pointer to the identifier of data for the performance), a pointer to the node S2 (i.e., a pointer to an identifier of the data for the modified scene), and the node HH-St1'-St2 (to which the tree node T6 also points).

In this way, various identifiers for the six states (as well as the "empty folder" state) identify the content of each of these states without requiring that duplicative items in the states be separately stored. The user is able to jump from any state to any other state because the electronic content in any state can be created simply by using identifiers for that state (e.g., commit node with pointers to tree nodes and other commit nodes, tree nodes with pointers to objects added to the project, etc.), which can be used to identify the appropriate data (or other content) in the repository for creating the respective state.

Using hashes as the content identifiers provides numerous advantages. Using hashes allows fine-grained re-use of caches across undo and multiple states of the electronic content. It also allows the user to jump back in time an arbitrary distance and allows merging in changes from another user without issues. For example, in a character animator content creation application, one user could share electronic content with another user and each of the user's work on different parts of the electronic content. Later the users would merge the electronic content together seamlessly.

In some embodiments, a multi-user merge feature may be implemented by allowing multiple users to work with electronic content and combining (in any suitable manner) various representations of different states that result from edits performed by those users. For example, copies of content having multiple objects can be provided to, or otherwise accessed by, a first user and a second user. The copies include or are otherwise associated with respective content-addressable data stores that are identical to one another. For instance, prior to the first and second users making different edits to their respective copies, a first content-addressable data store for a first copy provided to the first user is identical to a second content-addressable data store for a second copy provided to the second user. The first user can then edit the first copy, and the second user can then edit the second copy independently of any edits by the first user. These independent edits are captured by, for example, using the first content-addressable data store for storing changes in state resulting from the first user's edits and using the second content-addressable data store for storing changes in state resulting from the second user's edits. In this manner, the first user can move between different states of the first copy of the content (e.g., undoing or redoing state changes), and the second user can the separately move between different states of the second copy of the content (e.g., undoing or redoing state changes).

Continuing with this example, edits from the first and second users can be merged by combining, at least in part, data from the first and second content-addressable data store. For instance, if the first user wishes to merge the second user's edits to the second copy with the first user's edits to the first copy, a computing device of the first user can access the second content-addressable data store. Data from the second content-addressable data store, which represents changes in state resulting from the second user's edits, is copied, moved, or otherwise combined with data in the first content-addressable data store. The first user can then move between a combined set of states (e.g., via undo or redo commands) in the first copy of the content, where the combined set of states includes states resulting from both the first user's edits and the second user's edits.

In some embodiments, merging a second user's edits into a first user's edits involves performing a single commit that captures multiple changes in state causes by the second user's edits. An application using the content-addressable data store may include conflict-handling capability for such merges. For example, no conflict may result if the second user's edits affect one or more objects in the content that are not affected by any of the first user's edits. But a conflict may result if the first and second users' edits have affected at least some of the same objects in the content, one or more application-specific rules or user interface functions can be used to determine which of the first or second edits to accept as part of the merging process.

In additional or alternative embodiments, merging a second user's edits into a first user's edits involves adding data to the first content-addressable store allows multiple changes in state causes by the second user's edits to be traversed by the first user. For example, two users may edit identical copies of a document, where the two copies have identical content-addressable data stores when the two copies are in an initial state R. The initial state R is a state of the document prior to any different edits by the first and second users (i.e., when the first copy of the document is still identical to the second copy of the document). From the initial state R, the first user may make edit A followed by edit B. These edits can be captured using the first content-addressable store in the manner described above (e.g., using tree nodes to access states corresponding to edits A and B). Separately, from the initial state R, the second user may make edit C followed by edit D (e.g., using tree nodes to access states corresponding to edits C and D). These edits can be captured using the second content-addressable store in the manner described above.

To merge the second user's edits with the first user's edits, the edits C and D from the second content-addressable store can be added to the first content-addressable data store. In some embodiments, an application used to edit the first copy adds the edits C and D in a fully automatic fashion, provided that edits C and D do not conflict with edits A and B. In additional or alternative embodiments, an application for editing the first copy is used to manually add the edits C and D to the first content-addressable data store through an application-specific user interface.

In these various embodiments, the addition of edits C and D results in a new (or modified) content-addressable data store for the first user that begins with state R, and then has states corresponding to the edits A, B, C, and D in some logical order. For example, the state R and the edits A, B, C, and D can be represented by a set of tree nodes corresponding to R, A, B, C, and D, in which pointers from one node to another indicate the ordering of the nodes.

In some embodiments, the merging process involves an application using a content-addressable data store may reorder or remove edits entirely, either automatically or in response to inputs from a user of the application. For instance, if edit A deletes an object in the data store, and edit C changes the color of that object, one example of a possible ordering after a merge is [R, C, A, B, D], in which edit C is positioned before edit A to reflect a change in color to the object (edit C) prior to the object's deletion (edit A). Another example of a possible ordering after a merge is [R, A, B, D], in which the deletion of object via edit A supersedes the color change via edit C, thereby causing edit C to be removed entirely.

For illustrative purposes, the multi-user merge feature is described above using two users. But edits by any number of users (including one) may be merged using the features described herein. For instance, a single user may separately edit two different copies of a document, and the edits may be merged in the manner described above.

In some embodiments, not all aspects of each state of the electronic content need be represented. For example, while it is desirable to represent in some embodiment ephemeral aspects, including user interface aspects like selection, scrolling, and identifications of which panels are open or front-most, other embodiments will not include ephemeral aspects or will treat ephemeral aspects specially. In one embodiment, ephemeral aspects are dealt with specially so that undo/redo functions are able to, as examples, re-scroll or show a panel where the action took place, making the content creation application have a more intuitive feel and avoiding losing the user's place upon a re-launch of the content creation application.

Figure 10:
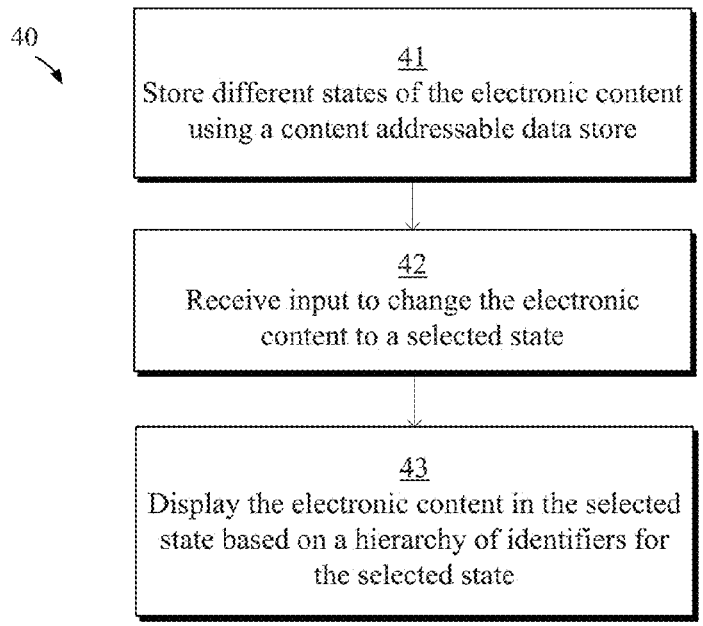
FIG. 10 illustrates an exemplary method of switching to a different state of electronic content in a content creation application.

FIG. 10 illustrates an exemplary method 40 of switching states of electronic content in a content creation application. Method 40 is provided by a processor executing instructions on a computing device. A variety of device configurations including the use of multiple processors, local, network, and/or cloud-based storage, input devices can be used depending upon the particular circumstances of the implementation of the method 40.

Method 40 begins with act 41 to store different states of the electronic content using a content-addressable data store. In one embodiment, this involves representing individual states of the electronic content using identifiers that identify items of respective states stored in the content-addressable data store. Identical items that are included in multiple states are stored only once in the content-addressable data store and referenced by common identifiers in the identifiers of the different states. In one example, the individual states are associated with individual commands that commit edit actions on the electronic content. In one example, items in the content-addressable data store are identified by hashes of contents of the items.

The electronic content is stored in a hierarchy of folders and blobs in one embodiment. The folders include other folders or blobs and the blobs include content of items of the electronic content. The one or more identifiers of a respective state, in this example, identify one or more folders and/or blob associated with the respective state. For example, the content-addressable data store in one embodiment is implemented as a Git-formatted data store.

The method 40 also includes the act 42 of receiving input to change the electronic content to a selected state and act 43 of displaying the electronic content in the selected state using the identifiers for the selected state. Where the input is an undo command, this involves displaying the electronic content with action from a previous command undone. Where the input is a redo command, this involves displaying the electronic content with action redone from a command that had been undone.

In another embodiment, a list identifying a history of the different states of the electronic content is displayed and the user provides input to change the state by making a selection on the list. In one embodiment, individual states of electronic content are associated with individual commands used to commit edit actions on the electronic content. The content creation application displays a list identifying a history of the individual commands and receives a user selection on the list to change the electronic content to the selected state. Such a list, in one embodiment, does not include ephemeral commits. In an alternative embodiment, one or more ephemeral commits are associated with an individual commit using an ephemeral "shadow" or by adding a new commit that includes the ephemeral change, where the new commit uses the same name and parent as another item that does not include the ephemeral commit.

In one embodiment, the content creation application displays the content in the selected state without creating the selected state from scratch. Doing so can make the processing more efficient and faster. In one example, displaying the electronic content involves identifying items that have changed between states and only changing the identified items. In one case, items that have changed between states are identified by comparing hash values associated with a current state and the selected state and only changing the display of the identified items.

Figure 11:
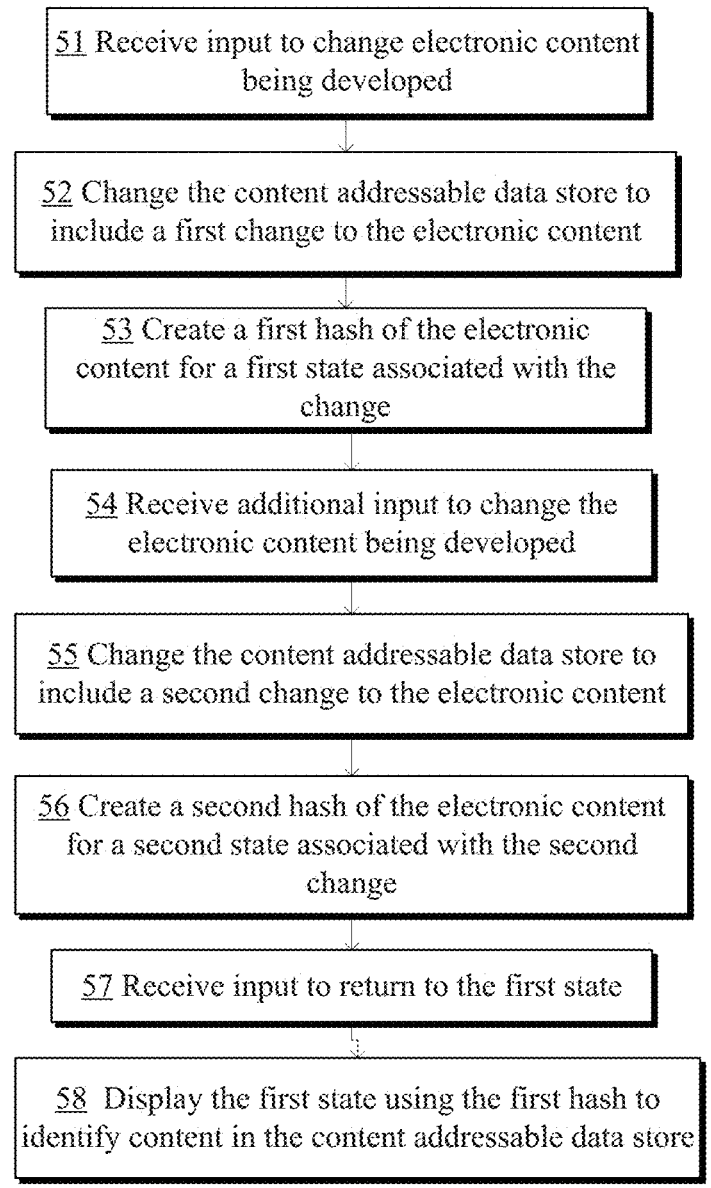
FIG. 11 illustrates an exemplary method of creating multi-state electronic content and returning to a prior state using a content-addressable data store.

FIG. 11 illustrates an exemplary method 50 of creating multi-state electronic content and returning to a prior state using a content-addressable data store. Method 50 is provided by a processor executing instructions on a computing device. A variety of device configurations including the use of multiple processors, local, network, and/or cloud-based storage, input devices can be used depending upon the particular circumstances of the implementation of the method 50.

Method 50 begins with act 51 receiving input to change electronic content being developed, act 52 changing the content-addressable data store to include a first change to the electronic content, and act 53 creating a first hash of the electronic content for a first state associated with the change. For example, a user imports a file to use as the basis for a character in electronic content being developed, data of the file is stored in a repository, and a hash of the data is used as an identifier for accessing the character from the repository.

Method 50 also includes act 54 receiving additional input to change electronic content being developed, act 55 changing the content-addressable data store to include a second change to the electronic content, and act 56 creating a second hash of the electronic content for a second state associated with the change. For example, a user adds a stick to a leg of the character in the electronic content being developed, data is stored in the repository for the stick, and a hash of the data is used as an identifier for stick added to the character.

Method 50 further includes act 57 receiving input to return to a first state and act 58 to display the first state using the first hash to identify content in the content-addressable data store corresponding to the first state. For example, this can involve retrieving the character data to display the character on an editing canvas. In this way, the stick, which was previously displayed on the editing canvas displaying the electronic content in the second state, is no longer displayed.

Traditional content creation application use callbacks for various purposes. For example, if a name is changed of an object on the user interface, the user interface gets a call back from the backend model based on the name changing. Thus, changing the name executed a name change and undoing executing the name change both sent a notification to the front end so that the front end knows to redraw content on the editing canvas. In this scheme, anything could change at any time. In contrast, embodiments of the invention disclosed herein that allow content of a state to simply be loaded at any time do not rely upon such a notification technique. In one embodiment, the techniques determine what the user interface should redraw in an efficient and intelligent manner. For example, one example uses hashes of the displayed content (before and after a state change) to determine what has changed. If the hash has changed, the portion of the canvas is redrawn accordingly. In this way, changes in hash value of electronic content items, which are already being stored, are used to identify when and where electronic content on an editing canvas of the content creation application should be redrawn. Thus in addition to the aspect of embodiments of the invention providing a novel way of storing electronic content in an efficient way using a content-addressable data store with hash-based identifiers, another aspect of embodiments of the invention allows changing the user interface without having to redraw everything on the interface. This second aspect is efficient because the hashes are already created for the storage of the different states.

One embodiment of the invention stores items of electronic content in Lua (a lightweight programming language) tables. In this embodiment, all persistent data is stored in the lua tables with numbers, strings, and user data stored as JSON (or the Lua equivalent). The developers of the content creation application can add edit commands and other functions without needing to know about or creating undo-compatible code. The developer programs support for ephemeral (silent) changes (as discussed in greater detail below) so that ephemeral changes are treated in an appropriate manner, for example, undone/redone automatically but not seen by the user in the history of edits. For example, changes to a position on a timeline, scrolling, or changing a selection of an object need not appear in the history of edits. In one embodiment, the lua tables are serialized to the equivalent of Git trees and JSON blobs (from folders and items) so that standard Git functions are usable. In one specific example, a programmer has the following methods available on an open project, which is a root Lua table equivalent to a Git-formatted project.

commit( ) take all changes to the tree and commit them to the data store (no-op if not dirty, besides clearing the current commitName); if setCommitName( ) has been called since the last commit, that name will be used for the commit; unnamed commits are ephemeral (which matters only at undo/redo time); equivalent to git commit -a -m <commitName>, but first doing a git checkout -B master if there are any outstanding redos possible (i.e. not at the tip of branch) In order to keep developers from having to call this explicitly, it is called at the app top level after handling any mouse-up or key-up or at idle (when no input-capture is active) or, in languages that support it, it could be called in the destructor of each task scoping object.

setCommitName(name) sets the user-visible name of the next commit; call before making the corresponding changes to the model; if any changes have already been made, they will be committed as an unnamed (ephemeral) commit setEphemeralCommitName (name) sets a non-user-visible name of the next commit, used only for debugging; this isn't strictly needed, but enforce calling it before any ephemeral changes to optimize-away calls to commit( ) without having to re-compute hashes bool isDirty( ) returns true if any changes have been made to the model since the last commit/undo/redo (for efficiency, this is implemented by keeping track of calls to setCommitName/setEphemeralChange rather than hashing)

undo( ) rolls back the state of the project to the previous commit (commits first if dirty); equivalent to git checkout HEAD^ redo( ) reverses the last undo( ) only available if not dirty and no commits have happened since the last undo( ) and there are still some undos left to redo; equivalent to git checkout master~N where N is the distance from the tip of master (i.e. the number of redos to get back to the furthest change −1)

getUndoNames(int n) Returns the names of the last n named commits (non-ephemeral) that will be undone if you call undo( )

getRedoNames(int n) returns the names of the next n named commits (non-ephemeral) that will be redone if you call redo( )

In one embodiment, most things are stored in the model. However, if there are any persistent things that the developer does not want to be undone/redone a separate tree is used. Similarly, if a separate undo/redo scheme is used for some objects (e.g. for view changes), those are stored in their own tree.

Change notification is also provided for the particular circumstances of the implementation of embodiments of the invention. In one example, in which all nodes in a project tree have content-based hashes, there is no need for broadcasting change notification messages at change time. Instead, a push-pull hash-check scheme is used that avoids idle polling but still uses single polling. In a specific example, this involves at some top level after an event such as a mouse or key event processing, setting a flag to indicate that something might have changed in the model. Other ways for the model to change would also set the flag. At idle time, if the flag is set, the flag is cleared and a scan is performed of interested parties (i.e., those who indicated an interest in something in the model). That interest was registered as a path to the element and a hash. If either the path no longer exists or the hash has changed, the interested party is called to update their cache and refresh the screen.

One benefit to providing a permanent history using content-addressable storage relates to testing. With this type of storage, all inputs to a portion of content being developed can be segregated (i.e., fenced) from other inputs and data crossing to the portion of content can be recorded. The developer can later replay that data starting at a recent commit to reproduce a crash or other buggy behavior. In addition, each trace can be used as a pinning test. Subsequent builds can run automatic tests to verify that the hash of content is unchanged when reapplying the same trace. If it diverges, the moment that it happens is identified. These data traces become stale as code is changed (i.e., hash changes are expected when the application changes). Distinguishing fenced material at different levels can help with trace re-use. For example, a fence around all event handling is an easy way to record all user actions, but the trace becomes invalid when controls change or move, or when monitor size changes. Making all model-changing actions go through a bottleneck can provide a better semantic fence so that traces are not invalidated by user interface changes. Note that there are subtle ways for data to cross the fence if, for example, access to the file system or clipboard needs to be added to the trace.

In one embodiment, every time a user takes an action to change the electronic content there is a commit, and each commit has a name that shows up in the history of user actions from which the user can select to change the state of the electronic content. In another embodiment, some actions that call a commit (such as a selection) are considered ephemeral changes or ephemeral commits and are not included in the history to avoid cluttering up the history. In one embodiment, ephemeral commits are grouped with adjacent non-ephemeral commits for undo/redo/state change purposes. Independently, a shadow concept allows a given change to be treated as part of a prior commit for undo purposes, without modifying the existing commit, similar to how a shadow cannot be separated from the object that casts the shadow. Since these shadows are not apparent to the user, they are also ephemeral, and are referenced as "ephemeral shadows" herein. An ephemeral shadow is a commit with a special name that indicates that the commit should not be separated from the one next to it. An ephemeral-shadow feature can also be implemented by replacing the most recent commit with a new one, effectively binding the shadow into the commit.

Figure 12:
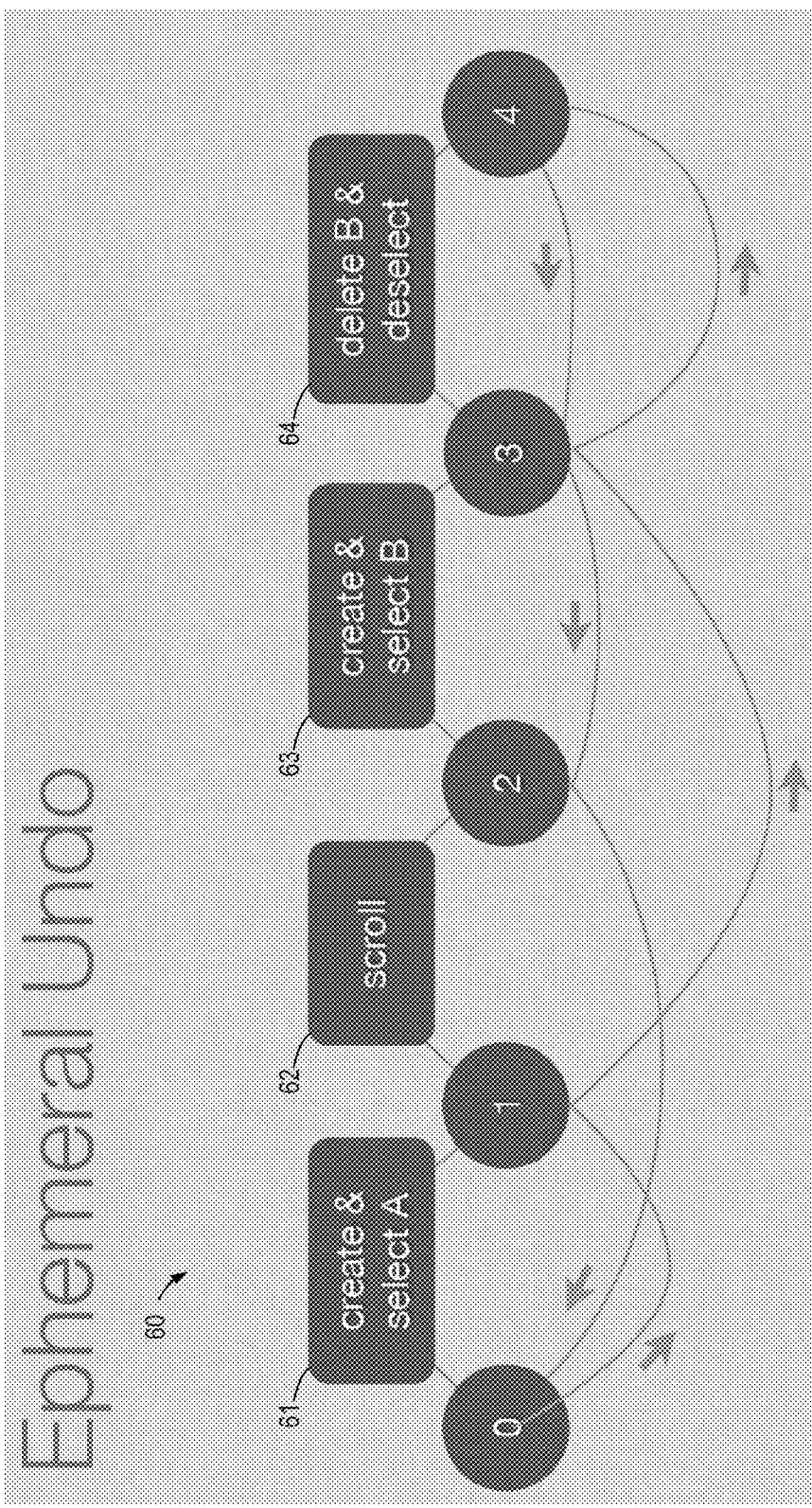
FIG. 12 is a flowchart illustrating an ephemeral commit undo and redo.

FIG. 12 is a flowchart illustrating an ephemeral commit undo and redo scheme. This example involves a create and select A 61, a scroll 62, a create and select B 63, and a delete B and deselect 64. The user first performs each of these actions in sequence proceeding from state 0 to state 1 to state 2 to state 3 to state 4. Scrolling is an ephemeral commit that should not show up in the history but that should be undone and redone. In state 4, when undo is selected, the state returns to state 3. On state 3, when undo is selected, the state returns to state 2. But on state 2, when undo is hit, the system should go to state 0 rather than state 1. This is because it is desirable to scroll to the place where A was created and selected when the creation and selection of A is undone. Going forward with redo commands, the state goes from 0 to 1, this time stopping on state one because, if the interface scrolled 62, the creation and selection of A would not be shown. Then when the user selects redo again from state 1, it is desirable to go to state 3, skipping state 2. The example of FIG. 12 illustrates that the treatment of an ephemeral commit, such as scroll 62, is asymmetrical going forward and backwards. Ephemeral commits are thus implemented so that the user interface behaves in an intuitive manner to the user and doing so can involve asymmetric treatment going forward and backward.

Another embodiment addresses an ephemeral commit that comes in after a commit to which it is to be attached is already created. Rather than creating an ephemeral shadow, a new commit with the same name as the one that is being replaced is inserted into the repository. The effect of this is to cut the earlier version so it will never be referred to by anything ever again. In this way, the immutable data store is effectively updated to support an ephemeral commit that comes after the fact.

Figure 13:
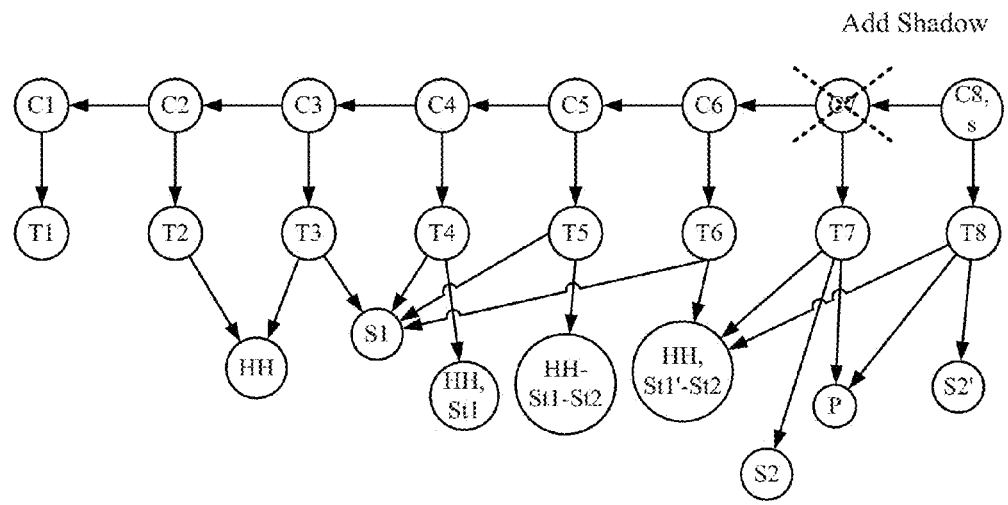
FIG. 13 illustrates an example of an ephemeral shadow being added to the project depicted in FIGS. 3-8.

Ephemeral shadow functionality can be implemented in any suitable manner. For instance, FIG. 13 illustrates one example of an ephemeral shadow being added to the project depicted in FIGS. 3-8. In this example, it may be desirable to modify the state corresponding to the commit node C7 and to prevent the state corresponding to the commit node C7 from being presented in response to a "undo" or "redo." To do so, a new state is created. The tree node T8 points to certain elements in the state corresponding to the commit node C7, and also points to one or more nodes that are additions or changes to the state corresponding to the commit node C7. For instance, in this example, the tree node T8 includes a pointer to a node S2', which is a new node representing a modified version of the scene corresponding to the node S2. The tree node T8 also includes pointers to the node P (i.e., a pointer to the identifier of data for the performance) and to the node HH-St1'-St2 (to which other tree nodes also point).

The tree node T8 and the elements to which it points are committed using a commit node C8,s. The commit node C8,s is tagged or otherwise identified as an ephemeral shadow the commit node C7. Identifying the commit node C8,s as an ephemeral shadow of the commit node C7 causes a traversal from C8,s to C7 to result in a further traversal to C6, without presenting the state corresponding to the commit node C7. In this manner, an "undo" operation that involves the state corresponding to C8 can result in recreating the state corresponding to C6, rather than the state corresponding to C7. Furthermore, identifying the commit node C8,s as an ephemeral shadow of the commit node C7 causes a traversal from commit node C6 in the direction of commit node C8,s to omit a presentation of the state corresponding to the commit node C7. In this manner, a "redo" operation can result in recreating the state corresponding to the commit node C8,s, rather than the state corresponding to the commit node C7.

Figure 14:
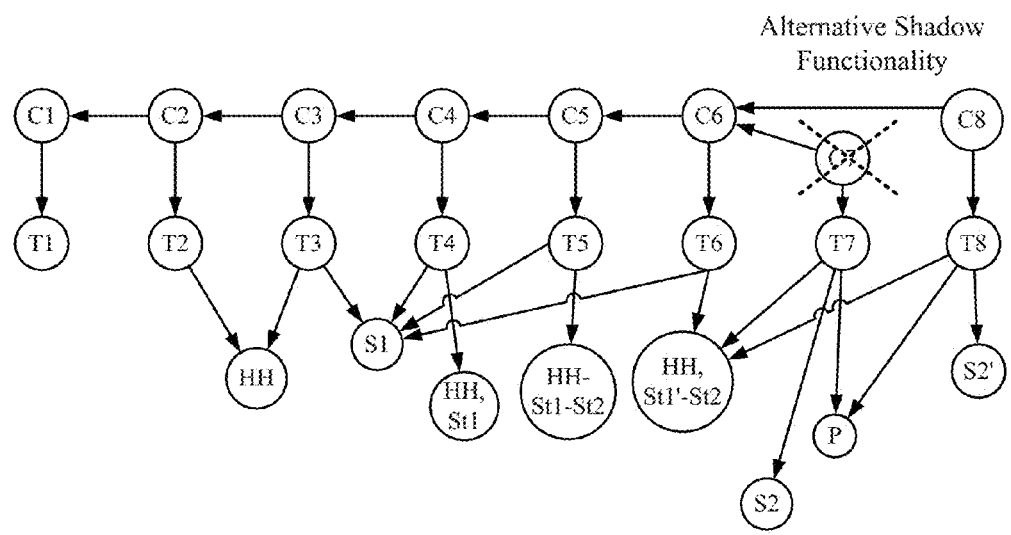
FIG. 14 illustrates an alternative example of an ephemeral shadow being added to the project depicted in FIGS. 3-8.

In additional or alternative embodiments, the shadow functionality described above can be implemented without identifying a commit as an ephemeral shadow of the commit node C7. For example, FIG. 14 illustrates an alternative example in which the commit node C8 is not explicitly identified as an ephemeral shadow of the commit node C7. Instead, the commit node C8 includes a pointer to C6 rather than a pointer to C7 (as depicted in FIG. 13). Subsequent changes in state can be committed using commits with pointers leading to C8 rather than C7. In this manner, an "undo" operation that involves the state corresponding to C8 can result in recreating the state corresponding to C6, rather than the state corresponding to C7. Furthermore, a traversal from commit node C6 in the direction of commit node C8 can omit a presentation of the state corresponding to the commit node C7. In this manner, a "redo" operation can result in recreating the state corresponding to the commit node C8 rather than the state corresponding to the commit node C7.

Figure 15:
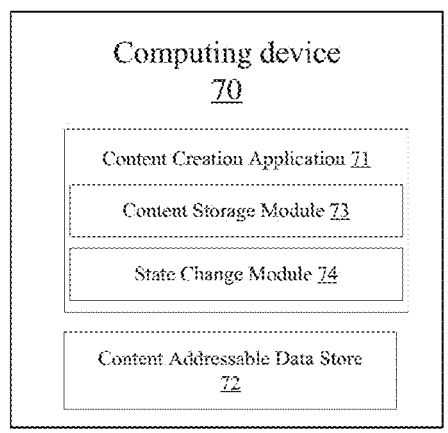
FIG. 15 is a block diagram depicting an example of a computer system for implementing a content creation application that stores electronic content using a content-addressable data store.

FIG. 15 is block diagram depicting an example of a computer device 70 for implementing a content creation application that stores electronic content using a content-addressable data store. In this example, the computing device 70 includes a content creation application 71 and a content-addressable data store. A content storage module 73 of the content creation application 71 receives edits from a user to change electronic content being created and stores information reflecting the state of the electronic content after each change in the content-addressable data store 72. The state change module 74 of the content creation application 71 receives undo commands, redo commands, and/or state change commands from the user editing the electronic content and changes the state of the electronic based on the content-addressable data store.

Figure 16:
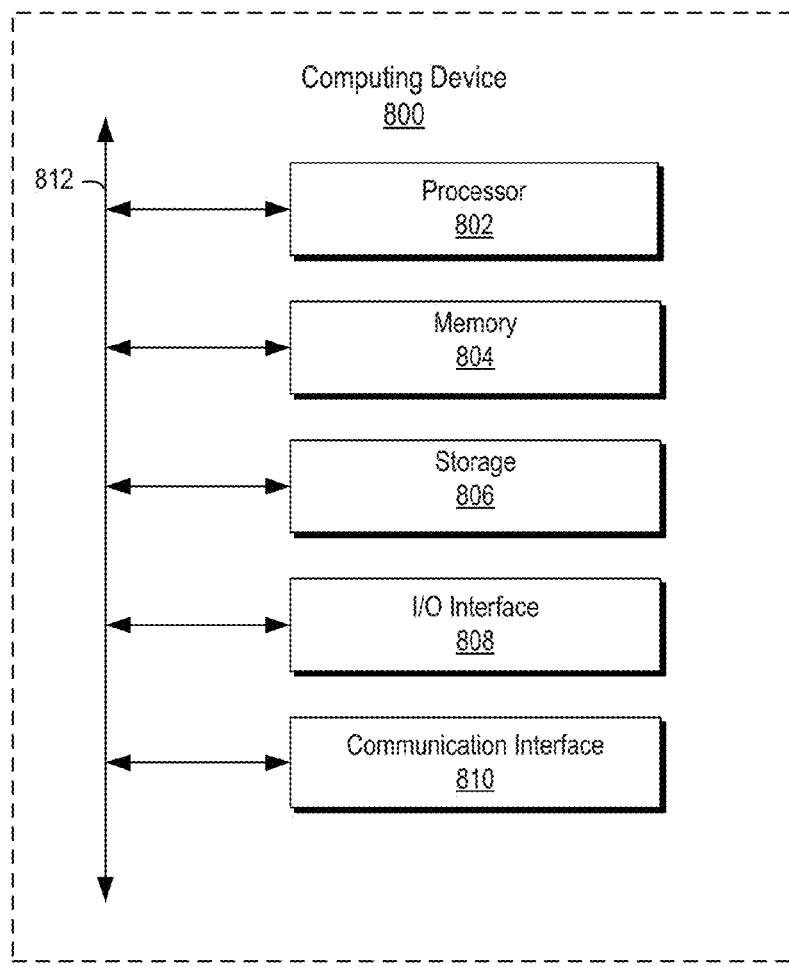
FIG. 16 is a block diagram depicting an example of a computing system.

Any suitable computing system or group of computing systems can be used to implement the techniques and methods disclosed herein. For example, FIG. 16 is a block diagram depicting examples of implementations of such components. The computing device 800 can include a processor 802 that is communicatively coupled to a memory 804 and that executes computer-executable program code and/or accesses information stored in memory 804 or storage 806. The processor 802 may comprise a microprocessor, an application-specific integrated circuit ("ASIC"), or other processing device. The processor 802 can include one processing device or more than one processing device. Such a processor can include or may be in communication with a computer-readable medium storing instructions that, when executed by the processor 802, cause the processor to perform the operations described herein.

The memory 804 and storage 806 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, Lua, and ActionScript.

The computing device 800 may also comprise a number of external or internal devices such as input or output devices. For example, the computing device is shown with an input/output ("I/O") interface 808 that can receive input from input devices or provide output to output devices. A communication interface 810 may also be included in the computing device 800 and can include any device or group of devices suitable for establishing a wired or wireless data connection to one or more data networks. Non-limiting examples of the communication interface 810 include an Ethernet network adapter, a modem, and/or the like. The computing device 800 can transmit messages as electronic or optical signals via the communication interface 810. A bus 812 can also be included to communicatively couple one or more components of the computing device 800.

The computing device 800 can execute program code that configures the processor 802 to perform one or more of the operations described above. The program code can include one or more modules. The program code may be resident in the memory 804, storage 806, or any suitable computer-readable medium and may be executed by the processor 802 or any other suitable processor. In some embodiments, modules can be resident in the memory 804. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of switching states of electronic content being developed in a content creation application, the method comprising:
   storing, by a processing device, content items for a first state of electronic content in a content-addressable data store, the content items comprising graphical objects and the first state indicating a first graphical output built from a combination of the content items;
   generating, by the processing device, respective identifiers for the content items;
   associating the generated identifiers with the content items and the first state;
   determining, by the processing device, that a second state of the electronic content at least partially corresponds to a subset of the content items that are stored in the content-addressable data store and that are associated with the first state, the second state indicating a second graphical output built from a combination of at least the subset of the content items;
   associating a subset of the identifiers for the stored subset of the content items with the second state in addition to the first state, wherein the subset of the content items included in the first state and the second state is stored once in the content-addressable data store and is referenced by common identifiers for both the first state and the second state;
   retrieving, responsive to input selecting a state that is one of the first state and the second state, the subset of the content items from the content-addressable data store using the identifiers;
   building a selected graphical output by combining at least the subset of the content items; and
   displaying the selected graphical output corresponding to the electronic content in the selected state.

2. The method of claim 1, wherein the input is an undo command and displaying the electronic content in the selected state comprises displaying the electronic content with action from a previous command undone.

3. The method of claim 1, wherein the input is a redo command and displaying the electronic content in the selected state comprises displaying the electronic content with action redone from a command that had been undone.

4. The method of claim 1, wherein the first state and the second state are respectively associated with individual commands that commit edit actions on the electronic content.

5. The method of claim 1, wherein generating the identifiers for the content-addressable data store comprises generating hashes of contents of the content items.

6. The method of claim 1, wherein storing the content items in the content-addressable data store comprises storing the content items in a hierarchy of folders and blobs, wherein the folders include other folders or blobs and the blobs include the content items.

7. The method of claim 6, wherein retrieving the subset of the content items from the content-addressable data store using the identifiers comprises:
   selecting a folder or blob based on at least one of the identifiers identifying the folder or blob; and
   retrieving the subset of the content items from the selected folder or blob.

8. The method of claim 1, wherein generating the identifiers for the content-addressable data store comprises generating hashes of contents of the content items;
   wherein storing the content items in the content-addressable data store comprises storing the content items in a hierarchy of folders and blobs and associating the hashes with the folders and blobs,
   wherein retrieving the subset of the content items from the content-addressable data store comprises:
   selecting a folder or blob using the hashes, and
   retrieving the subset of the content items from the selected folder or blob.

9. The method of claim 1, wherein the content-addressable data store is a Git-formatted data store.

10. The method of claim 1, further comprising displaying a list identifying a history of different states of the electronic content, wherein the input selecting the state comprises a user selection from the list.

11. The method of claim 1, further comprising:
    associated individual states with individual commands used to commit edit actions on the electronic content;
    displaying a list identifying a history of the individual commands, wherein the list does not identify ephemeral commits; and
    receiving a user selection on the list to change the electronic content to the selected state.

12. The method of claim 1, further comprising:
    associated individual states with individual commands used to commit edit actions on the electronic content; and
    associating an ephemeral commit with an individual command.

13. The method of claim 12, wherein associating the ephemeral commit with the individual command comprises at least one of:
    using an ephemeral shadow; or
    adding a new item that includes the ephemeral commit, the new item given a same name as another item that does not include the ephemeral commit.

14. The method of claim 1, further comprising storing different states of the electronic content using the content-addressable data store, wherein storing the different states of the electronic content comprises:
storing, using the content-addressable data store, a first set of states resulting from edits to the electronic content that are performed by a first user,
accessing an additional content-addressable data store, the additional content-addressable data store storing a second set of states resulting from edits to a copy of the electronic content that are performed by a second user, and
updating, using the additional content-addressable data store, the content-addressable data store to include the second set of states in addition to the first set of states, wherein the selected state comprises at least one state from the second set of states.

15. The method of claim 1, wherein displaying the electronic content comprises identifying items that have changed between states by comparing hash values associated with a current state and the selected state and only changing the identified items on a display.

16. The method of claim 1, wherein the content creation application is a character animation application in which puppets are created and moved based on additional input received by capturing video and audio of a user.

17. A system comprising:
a processor;
instructions stored in a non-transitory computer readable medium, wherein, when executed by the processor, the instructions perform operations comprising:
storing content items for a first state of electronic content in a content-addressable data store, the content items comprising graphical objects and the first state indicating a first graphical output built from a combination of the content items,
generating respective identifiers for the content items,
associating the generated identifiers with the content items and the first state,
determining that a second state of the electronic content at least partially corresponds to a subset of the content items that are stored in the content-addressable data store and that are associated with the first state, the second state indicating a second graphical output built from a combination of at least the subset of the content items,
associating a subset of the identifiers for the stored subset of the content items with the second state in addition to the first state, wherein the subset of the content items included in the first state and the second state is stored once in the content-addressable data store and is referenced by common identifiers for both the first state and the second state,
retrieving, responsive to input selecting a state that is one of the first state and the second state, the subset of the content items from the content-addressable data store using the identifiers,
building a selected graphical output by combining at least the subset of the content items, and
displaying the selected graphical output corresponding to the electronic content in the selected state.

18. The system of claim 17, wherein the input is an undo command or a redo command.

19. The system of claim 17, wherein generating the identifiers for the content-addressable data store comprises generating hashes of contents of the content items.

20. A non-transitory computer readable medium comprising program code, the program code comprising program code that, when executed by processing device, configures the processing device to perform operations comprising:
storing content items for a first state of electronic content in a content-addressable data store, the content items comprising graphical objects and the first state indicating a first graphical output built from a combination of the content items;
generating respective identifiers for the content items;
associating the generated identifiers with the content items and the first state;
determining that a second state of the electronic content at least partially corresponds to a subset of the content items that are stored in the content-addressable data store and that are associated with the first state, the second state indicating a second graphical output built from a combination of at least the subset of the content items;
associating a subset of the identifiers for the stored subset of the content items with the second state in addition to the first state, wherein the subset of the content items included in the first state and the second state is stored once in the content-addressable data store and is referenced by common identifiers for both the first state and the second state;
retrieving, responsive to input selecting a state that is one of the first state and the second state, the subset of the content items from the content-addressable data store using the identifiers;
building a selected graphical output by combining at least the subset of the content items; and
displaying the selected graphical output corresponding to the electronic content in the selected state.

* * * * *